(12) United States Patent
Lemaire et al.

(10) Patent No.: US 9,910,822 B2
(45) Date of Patent: Mar. 6, 2018

(54) NETWORK INTERFACE FOR A SOC COMPRISING AN IMPROVED COMMUNICATION CONTROLLER

(71) Applicants: Commissariat a l'energie atomique et aux energies alternatives, Paris (FR); STmicroelectronics (Canada), Inc., Halifax (CA)

(72) Inventors: Romain Lemaire, Seyssinet-Pariset (FR); Fabien Clermidy, Saint-Egreve (FR); Michel Langevin, Ottawa (CA); Charles Pilkington, Ottawa (CA)

(73) Assignees: Commissariat à l'énergie atomique et aux ènergies alternatives, Paris (FR); STMICROELECTRONICS (CANADA), INC., Halifax (CA)

( * ) Notice: Subject to any disclaimer, the term of this patent is extended or adjusted under 35 U.S.C. 154(b) by 137 days.

(21) Appl. No.: 14/762,040

(22) PCT Filed: Jan. 21, 2014

(86) PCT No.: PCT/EP2014/051092
§ 371 (c)(1),
(2) Date: Jul. 20, 2015

(87) PCT Pub. No.: WO2014/111589
PCT Pub. Date: Jul. 24, 2014

(65) Prior Publication Data
US 2015/0319106 A1 Nov. 5, 2015

(30) Foreign Application Priority Data
Jan. 21, 2013 (FR) ..................... 13 50519

(51) Int. Cl.
*H04L 12/933* (2013.01)
*H04L 12/24* (2006.01)
(Continued)

(52) U.S. Cl.
CPC ...... *G06F 15/7825* (2013.01); *H04L 41/0816* (2013.01); *H04L 47/39* (2013.01); *H04L 47/828* (2013.01); *H04L 49/109* (2013.01)

(58) Field of Classification Search
CPC . H04L 49/109; H04L 41/0816; H04L 47/828; H04L 47/39; H04L 47/00; H04L 47/10; G06F 15/7825; G06F 2213/0038
(Continued)

(56) References Cited

U.S. PATENT DOCUMENTS 7,577,820 B1 * 8/2009 Wentzlaff ............... G06F 15/16
712/10
8,683,000 B1 * 3/2014 Schlansker ............. H04L 47/39
709/212
(Continued)

FOREIGN PATENT DOCUMENTS

EP 1 641 197 A1 3/2006
EP 1 835 411 A1 9/2007

OTHER PUBLICATIONS

International Search Report dated Apr. 3, 2014, in PCT/EP2014/051092, filed Jan. 21, 2014.
(Continued)

*Primary Examiner* — Mark Rinehart
*Assistant Examiner* — Kenneth P Hunt
(74) *Attorney, Agent, or Firm* — Oblon, McClelland, Maier & Neustadt, L.L.P.

(57) ABSTRACT

A network interface for a first network on chip resource capable of interfacing a data processing unit in the first resource with the network, the network interface including an output communication controller including a mechanism detecting an indicator marking an end of communication between the first resource and at least one second resource with which a communication link is set up, and a mechanism
(Continued)

outputting a signal indicating closure of the link to be sent to the second resource, after detection of an end of communication indicator.

12 Claims, 5 Drawing Sheets

(51) Int. Cl.
*H04L 12/801* (2013.01)
*H04L 12/911* (2013.01)
*G06F 15/78* (2006.01)

(58) Field of Classification Search
USPC .................................. 370/254, 235; 709/235
See application file for complete search history.

(56) References Cited

U.S. PATENT DOCUMENTS

| | | | | |
|---|---|---|---|---|
| 2005/0203988 | A1* | 9/2005 | Nollet | G06F 15/7825 709/201 |
| 2006/0067218 | A1* | 3/2006 | Clermidy | H04L 47/39 370/230 |
| 2006/0123130 | A1* | 6/2006 | Shah | H04L 69/16 709/230 |
| 2007/0299970 | A1* | 12/2007 | Huang | H04L 1/1614 709/225 |
| 2009/0013331 | A1 | 1/2009 | May | |
| 2012/0089758 | A1* | 4/2012 | Yun | G06F 13/4022 710/110 |
| 2014/0207948 | A1* | 7/2014 | Lemaire | H04L 43/08 709/224 |
| 2015/0215059 | A1* | 7/2015 | Kerpez | H04M 11/062 379/406.01 |
| 2017/0220499 | A1* | 8/2017 | Gray | G06F 13/28 |

OTHER PUBLICATIONS

French Preliminary Search Report issued Sep. 23, 2013, in Patent Application No. FR 1350519, filed Jan. 21, 2013 (with English Translation of Category of Cited Documents).

David Wentzlaff, et al., "On-Chip Interconnection Architecture of the Tile Processor", IEEE Micro, vol. 27, No. 5, XP 011196754, Sep.-Oct. 2007, pp. 15-31.

Jaume Joven, et al., "QoS-ocMPI: QoS-aware on-chip Message Passing Library for NoC-based Many-Core MPSoCs" http://infoscience.epfl.ch/record/154788/files/pmea-final31.pdf, XP 002713021, Aug. 4, 2010, 8 pages.

Zhonghai Lu, "Building Communication Primitivesfor NOC", Special Topics in SoC, http://www.imit.kth.se/courses/2B1457/NoC_Course/PDF_present/Communication_Permititives_Zhonghai. pdf, XP 002713023, May 22, 2003, pp. 1-37.

* cited by examiner

NETWORK INTERFACE FOR A SOC COMPRISING AN IMPROVED COMMUNICATION CONTROLLER

TECHNICAL FIELD

This invention relates to the field of Systems on Chip (SoC) implementing a Network on Chip (NoC) and more particularly the field of network interfaces of a network on chip.

PRIOR ART

In order to satisfy the needs of applications such as high resolution video decoding or wireless high speed data transmission, it is known that so-called "heterogeneous" network on chip architectures can be implemented, in other words architectures composed of processing elements also called resources with different natures and that can be configured in the form of processor(s), hardware accelerator(s), reconfigurable unit(s), memory(ies).

FIGS. 1 and 2 illustrate an example of a Network on Chip (NoC) architecture according to prior art.

This architecture comprises a plurality of resources 1 capable of communicating with each other and exchanging data. Links denoted 2 are used to connect said resources 1, while nodes denoted 3 are used to set up a physical connection between the different links 2 and for switching communications.

One element 5 among the set of resources 1 included in such an architecture is designed to initiate communications on the network.

This element is usually called the network controller 5 and it can be used to program communications between a plurality of network resources that will perform tasks such as elementary data processing, for example calculations, or data storage, or coding/decoding of data (FIG. 1).

Each resource 1 in the network structure comprises a part or means that can be called the functional core or processing unit 12, dedicated particularly to data processing and/or calculations, and another part or means called the network interface 13 and that the resource 1 uses to communicate with the network (FIG. 2).

Network interfaces 13 are used to make communications independent of processing units. The role of a network interface is to manage incoming and outgoing communications to and from the processing unit locally, such that everything seen from the processing unit takes place as if connections with other processing units were of the point-to-point type. Network interfaces make communications possible between processing units with different natures. Network interfaces may also be connected to one or several network nodes.

A network on chip thus uses an interface layer to manage communications between the different network elements or resources.

Running an application using a system on chip may require cooperation of several resources. This cooperation is usually organised and synchronised by the network controller 5.

The network controller 5 monitors the variation of the data flow through the network. It sends data reception orders, processing orders and then send data orders to the different processing units through their associated network interfaces.

In each processing step, units report their corresponding activities to the network controller, for example through an interrupt mechanism. The network controller then makes decisions about subsequent actions to be taken by the processing unit(s).

This type of operation in centralised mode is easy to set up but is not very efficient in terms of latency. The network controller is continuously interrupted and the data flow takes place discontinuously. It is also difficult to change scale when the number of resources and therefore the number of processing units increases.

According to one known operating method, a network on chip can enable each resource in the network to process a set of data from one or several sending resources and to send a result of this processing to one or several receiving resources based on a scenario determined in advance, in order to process data flows. This scenario may be set up using a sequence of programming operations called "configurations".

These configurations are usually transmitted to resources by the network controller.

Document EP 1 835 411 A1 discloses a control system used to program configuration sequences for communication controllers. More precisely, the network controller supplies a configuration or a sequence of configurations to be adopted for execution of a task, to each network interface and associated processing unit pair. Each configuration is described by a configuration content, in other words a set of values of configuration parameters stored in the network interface, each configuration content defining an interface communication configuration and/or a processing unit operating configuration.

A network interface may comprise a local interface controller to provide configuration sequences and to manage parameter settings, and a configuration management unit.

A network interface also comprises an input controller module (not shown) associated with one or several input storage means, through which incoming data from the resource will pass. These storage means may for example be in the form of one or several FIFO units, or one or several memories, for which the input controller module can know the filling ratio and free addresses.

Depending on the manner in which it is configured, in particular the input controller module enables the resource to send special data called "credits" to other network resources, based on a mechanism for sending credits to synchronise communications in the network.

With such a mechanism, for example disclosed in document EP 1 641 197 A1, a first resource designed to receive data from a second resource to be processed or to be transmitted sends credits to the second resource to notify the second resource that it is authorised to send said data to be processed or to be transmitted, in accordance with what is specified in a current credit configuration management that the first resource uses.

The number of credits sent by the first resource provides a means of informing the second resource about the quantity of data that this second resource is authorised to send to the first resource. This number of credits depends on the free space available at the input to the first resource, and the quantity of data that the first resource is supposed to receive from the second resource. As described above, this data quantity is given in the current credit management configuration that the first resource uses.

Once it is authorised to send as a result of received credits, the second resource can send as many data as it is allowed by the credits sent by the first resource.

Thus, sending credits from the first resource to the second resource enables opening a path for data from the second resource to be sent to the first resource. This mechanism for sending credits makes sure that data sent by the second resource can be received by the first resource.

A network interface also includes an output communication controller module.

The output communication controller module is associated with one or several output storage means, through which output data from the resource will pass. These storage means may be in the form of one or several FIFO units, or one or several memories for which the outgoing information controller module can know the filling ratio and free addresses.

The output communication controller module may be designed particularly so that it can create data packets to be transmitted to one or several other receiving resources, depending on how it is configured.

In a network on chip, data flows may be of the static type with fixed exchanged data volumes, or of the dynamic type with variable exchanged data volumes.

For some applications such as video decoding, it is preferable to set up a dynamic data flow provided that the volume of data to be processed can vary with time.

Different solutions to problems related to management of dynamic data flows have been disclosed.

The document "*Separation of data flow and control flow in reconfigurable multi-core SoCs using the Gannet service-based architecture*", W. Vanderbauwhede, In Adaptive Hardware and Systems, 2007. AHS 2007. Second NASA/ESA Conference on, pages 326-333, August 2007 discloses a solution to configure communications on a network on chip. This solution requires two distinct networks, namely a first network to carry control data, a second network to carry data to be processed that requires a non-negligible hardware cost. Moreover, communications are managed through a network controller in the form of a microcontroller.

Such a network uses a complex communication protocol that takes a long time to set up connections and is only efficient for transfers of a large quantity of data.

The document "*The connection-then-credit flow control protocol for heterogeneous multicore systems-on-chip*", N. Concer, et al. Computer-Aided Design of Integrated Circuits and Systems, IEEE Transactions on 29(6):869-882, June 2010, discloses a protocol to set up a connection before beginning a data transfer by sending credit.

A disadvantage of this protocol is that the data volume to be exchanged has to be known when the communication is started.

The document "*An Optimized Message Passing Framework for Parallel Implementation of Signal Processing Applications*", by Saha et al., In Design, Automation and Test in Europe, 2008. DATE '08, pages 1220-1225, March 2008, discloses a solution for management of dynamic data flows using a communication interface called SPI "Signal Passing Interface".

One disadvantage of this implementation is due to the fact that data volumes to be processed are limited and the maximum quantity of information that will be transmitted has to be known predictively.

The problem arises of setting up a new network interface in a network on chip in order to efficiently manage dynamic data flows, and preferably being capable of managing static and dynamic data flows without the disadvantages mentioned above.

PRESENTATION OF THE INVENTION

This invention relates to a network interface for a first system on chip (SoC) resource capable of interfacing a data processing unit in said first resource with a NoC network of said system on chip, the network interface being provided with an input communication controller comprising:
  means of sending credits capable of sending credits to one or several network resources,
  means of receiving data, capable of receiving data to be processed from one or several network resources,
the network interface being also provided with an output communication controller comprising:
  means of receiving credits capable of receiving credits to be sent to one or several network resources,
  means of sending data, capable of sending data to be processed to one or several network resources.

According to the invention, the network interface also has an input or output controller comprising:
  means of detecting an indicator marking the end of communication between the first resource and at least one second resource with which a communication link is set up,
  means of outputting a signal indicating closure of said link, to be sent to the second resource, after detection of an end of communication indicator.

When resources are provided with such a network interface, data exchanges can be set up using a dynamic link.

When resources are provided with such a network interface, ends of communications between network on chip resources can be managed without the need for a general communication controller to transmit a signal indicating the end of communication to each resource individually.

The interface may also comprise means of outputting a signal to acknowledge closure of the communication link after detection of a signal indicating closure of the communication link from a network interface of the second resource.

The interface may also comprise means of outputting a start configuration change signal to be sent to the network interface controller, following closure of said communication link between the first resource and the second resource.

The given network interface communication controller may have at least a credit counter, the given communication controller also comprising means of outputting a signal to reset the credit counter following reception of a signal to acknowledge closure of the communication link.

The network interface may also include means of sending a signal indicating closure of said link to said processing unit, when a link closure acknowledgement indicator has been detected.

The network interface may also include means of detecting a type of communication link (static or dynamic) set up between the first resource and said second resource.

This network interface can thus know if the data quantity in a data flow that it sends and/or receives might change during a communication with another network interface of another network resource.

During the communication between said first resource and said second resource, the first resource may send data to be processed to the second resource, the second resource receiving data to be processed from the first resource. The signal indicating closure of said link to the second resource can then be included in data transmitted to the second resource.

The other communication controller among said output communication and input communication controllers may also comprise:
  means of detecting an indicator of the end of communication between the first resource and at least one other resource with which a communication link is set up, means of outputting a signal to indicate closure of said link to said other resource, following detection of an end of communication indicator.

This invention also relates to a system on chip comprising several resources connected to a network on chip through dedicated network interfaces, a network interface being adapted to interface a data processing unit of a resource with the network on chip, the system comprising means of setting up a communication between a first and a second resource through first and second associated network interfaces respectively, in which the first network interface is provided with an output communication controller comprising:

means of receiving credits, capable of receiving credits from the second network interface, and
means of sending data, capable of sending data to be processed output by the first resource, on the network to the second resource, and in which the second network interface has an input communication controller comprising:

means of sending credits capable of sending credits on the network to the first network resource, and
means of receiving data, capable of receiving data to be processed from the first network resource and addressed to the second resource, the system comprising means of setting up a dynamic communication between the first and second resources, for which the number of data to be exchanged is not known to network interfaces when the communication is being set up, the output communication controller of the first interface comprising:

means of receiving an end of communication indicator between the first resource and the second resource with which a dynamic communication is set up, and
means of sending a close communication message to the second resource on the network on chip, following detection of an end of communication indicator, and sending such a message terminates said dynamic communication and sending of data related to said communication, and in that the input communication controller of the second interface comprises:

means of receiving the close communication message sent by the first network interface, and reception of such a message terminates waiting for data to be processed by the second resource during this dynamic communication and sending of credits related to this communication.

Advantageously, the input controller of the second interface also comprises means of sending a message acknowledging closure of the communication on the network on chip to the first resource following reception of a close communication message, and in which the output controller of the first interface also comprises means of receiving the close communication acknowledgement message sent by the second resource.

This invention also includes a system on chip comprising several resources connected to a network on chip through dedicated network interfaces, a network interface being adapted to interface a data processing unit of a resource with the network on chip, the system comprising means of setting up a communication between a first and a second resource through associated first and second network interfaces respectively, in which the first network interface is provided with an output communication controller comprising:

means of receiving credits, capable of receiving credits from the second network interface, and
means of sending data, capable of sending data to be processed output by the first resource on the network to the second resource, the second network interface being provided with an input communication controller comprising:

means of sending credits capable of sending credits on the network to the first network resource, and
means of receiving data capable of sending data to be processed from the first network resource and to the second resource, the system comprising means of setting up a dynamic communication between the first and second resources, for which the number of data to be exchanged is not known by the network interfaces when the communication is set up, and the input communication controller of the second interface comprises:

means of receiving an indicator indicating the end of communication between the first resource and the second resource with which a dynamic communication is set up, and
means of sending a close communication message to the first resource, on the network on chip following detection of an end of communication indicator, and sending such a message terminates said dynamic communication and sending of credits related to this communication, and the output communication controller of the first interface comprising:

means of receiving the close communication message sent by the second network interface, and reception of such a message terminating waiting for credits by the first interface during this dynamic communication and sending of data related to this communication.

The output controller of the first interface may also comprise means of sending a message on the network on chip to acknowledge closure of the communication to the second resource, following reception of a close communication message, and in which the input controller of the second interface also comprises means of reception of the close communication acknowledgement message sent by the first resource.

Advantageously, a network interface may comprise means of informing a network interface controller about the end of communication after a dynamic communication is closed, and this controller can then reconfigure this network interface for a new communication.

A network interface may also comprise means of informing the resource processing unit associated with this network interface about the end of communication, after closure of a dynamic communication.

According to one possible embodiment of the system on chip in which static or dynamic communications can be set up between two network interfaces associated with two resources, a communication being static or dynamic depending on the quantity of data to be exchanged and known or unknown respectively when the communication between the resources is set up.

The system on chip may be configured such that during a given communication between the first and second resources, data sent by the first interface always transit through the same physical communication link of the network on chip, and credits sent by the second interface always transit through the same physical communication link of the network on chip, to assure time scheduling of data and credits respectively.

BRIEF DESCRIPTION OF THE DRAWINGS

This invention will be better understood after reading the description of example embodiments given purely for information and in no way limitative, with reference to the appended drawings in which.

Identical, similar or equivalent parts of the different figures have the same numeric references to facilitate comparisons between the different figures.

The different parts shown in the figures are not necessarily all at the same scale to make the figures more easily readable.

DETAILED PRESENTATION OF PARTICULAR EMBODIMENTS

Figure 1:
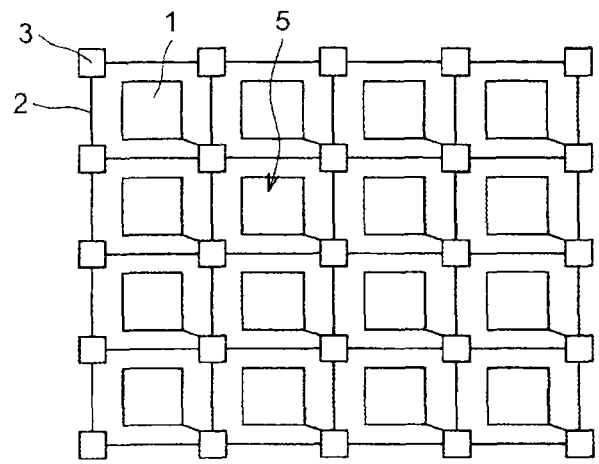
FIGS. 1 and 2 show a system on chip SoC according to prior art.
Figure 2:
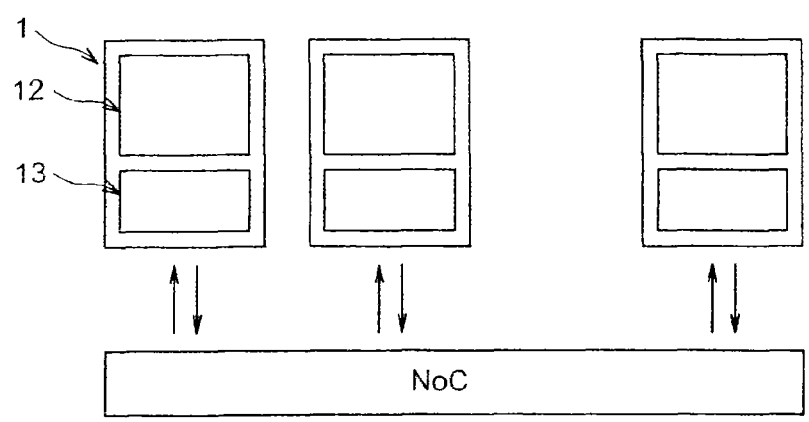
Figure 3:
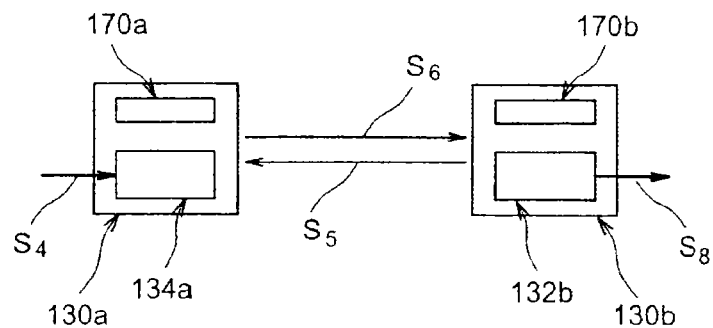
FIG. 3 shows exchanges between network interfaces of a system on chip.

FIG. 3 shows an example exchange between a first network interface 130a of a first resource A and a second network interface 130b of a second resource B through a NoC network of a system on chip SoC used according to the invention.

Each network interface 130a, 130b comprises an input communication controller 132 (not shown for the first interface 130a) and an output communication controller 134 (not shown for the second interface 130b).

Data to be transmitted originating from a processing unit (not shown in FIG. 3) of the first resource A, and in the form of a data flow $S_4$ are received by the output communication controller 134a of the first network interface 130a and transmitted to the input communication controller 132b of the second network interface 130b that then restores a data flow $S_7$ to a processing unit not shown in FIG. 3) of the second resource B.

In this example, the output communication controller 134a of the first network interface 130a, transmits data $S_6$ to an input communication controller 132b of the second network interface 130b, after the input communication controller 132b of the second network interface 130b has transmitted credits $S_5$ to the output communication controller 134a of the first network interface 130a authorising sending data $S_6$ and informing the first resource A about the quantity of data $S_6$ that it is authorised to send.

Data and credit exchanges take place continuously during normal operation, data output from the output controller of a sending resource are transmitted to the input communication controller of the receiving resource as they become available.

Network interfaces 130a, 130b, are also provided with a first local interface controller 170a and a second local interface controller 170b designed to make interfaces adopt a configuration or a series of configurations.

At the beginning of a communication between resources A and B, the communication controllers 134a and 132b can receive given information giving the type of communication that will be set up between the first network interface 130a and the second network interface 130b, particularly if this communication is of the static type or dynamic type.

This given information may be in the form of a configuration, and for a static communication it will give the data quantity that will be exchanged between the first resource A and the second resource B, or for a dynamic communication it will inform that the volume of data exchanged between the first resource A and the second resource B is not known when the communication is set up and will be decided upon during the communication.

In order to terminate a communication that has been set up particularly between the first resource A and the second resource B, and possibly to subsequently reconfigure a new communication, for example to reach another destination, the data sending processing unit may send an end of data transmission signal $S_8$ to terminate the communication.

This signal $S_8$ is then transmitted to the output communication controller 134a of the first resource A and indicates that all data expected to transit on the link between the first resource A and the second resource B have been transmitted. The output communication controller 134a may thus comprise means of detecting a signal or end of data transmission information indicating an end of communication. This end of data transmission signal $S_8$ may advantageously be contained in a data flow to be transmitted.

Figure 4A:
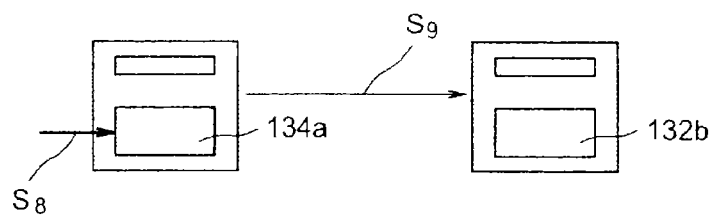
FIGS. 4A-4C show a first method of managing the end of communication between network interfaces of resources of a system on chip according to one embodiment of the invention.

After this event, the output communication controller 134a of the first interface 130a may output and send a close communication message $S_9$ indicating that the communication between the network interface 130a of the first resource A and the network interface 130b of the second resource B is terminated (FIG. 4A).

Figure 4B:
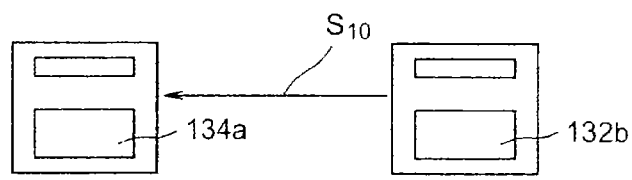

Following the reception of such a close communication message $S_9$, the input controller 132b of the second network interface 130b may be designed to output and send a close communication acknowledgement signal $S_{10}$ (FIG. 4B).

Figure 4C:
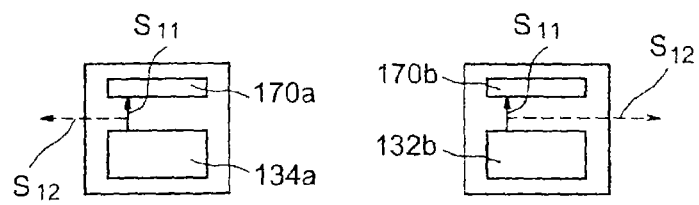

Then, the communication controllers 134a, 132b of the first network interface 130a and the second network interface 130b may also be adapted to inform their corresponding network interface controllers 170a, 170b that they are waiting for a new configuration to be run, through a wait for configuration signal $S_{11}$ (FIG. 4C).

Thus, the network interface controllers 170a, 170b, can directly reconfigure their corresponding interfaces so that they can set up another communication. In this case, reconfiguration means that interfaces can set up a configuration change.

In this example embodiment, configurations can be chained without the need for a network controller as described above in the prior art part of this application.

By eliminating the need for a general network controller, a network on chip with better latency and performance can thus be implemented.

According to one possible embodiment, the communication controllers 134a, 132b, may also use another close communication signal $S_{12}$ to indicate that the communication set up between the first resource A and the second resource B is terminated and closed, for use by processing units (not shown) with which their communication interfaces 130a, 130b respectively are associated.

For example, in a case in which the processing unit performs iterative processing, this informs the processing unit that it can terminate this processing.

The close communication message $S_9$ sent by the output communication controller 134a of the first interface 130a may be sent once all data from the first resource A to the second resource B have been transmitted.

According to one particular embodiment, this close communication message $S_9$ may be accompanied by or even included in a data packet containing the last data from the first resource A and transmitted to the second resource B.

Time and passband can be saved when such a message is input into the content of the data themselves.

The close communication acknowledgement message $S_{10}$ sent by the input communication controller 132b of the second interface 130b is sent once all data from the first resource A addressed to the second resource B have been transmitted.

This guarantees that there is no longer any data and/or credit traffic in transit in the network when the input communication controller 132b, and the output communication controller 134a send the end of communication signal $S_{11}$ to the corresponding processing units with which the first network interface 130a and the second network interface 130b respectively are associated.

The close communication acknowledgement signal $S_{10}$ can also trigger a reset of the credit counter of the output communication controller 134a that counts down a number of available credits.

The output communication controller 134a of the first interface 130a can then receive credits again, as soon as a new credit management configuration has been run.

This prevents credits received by the first resource A from a previous sending resource, in other words a resource that had sent these credits during a previous communication, from being used to send data to a new resource receiving a new configuration when this resource is not supposed to receive them.

Network interfaces may also be designed so that sending the acknowledgement signal $S_{10}$ to close the communication can reset a credit counter counting down a number of credits sent by the input communication controller 132b so that these credits once again available for another communication can be used.

If a static link is set up between the first resource A and the second resource B, the end of communication criterion and therefore the criterion to close the static communication between these two resources, can be directly associated for the first resource with a total number of credits to be received or data to be sent and, for the second resource, with a total number of credits to be sent or data to be received.

In this case, when the number of credits to be sent/received or the number of data to be sent/received is reached, each resource can conclude that the communication is terminated.

Thus, it may not be necessary to send a close communication message such as $S_9$ in the case of a static communication. Communication controllers 132, 134 can directly signal the end of transfer and send a signal $S_{11}$ to their corresponding network interface controllers to inform them that they are waiting for a new configuration to be run.

Figure 5A:
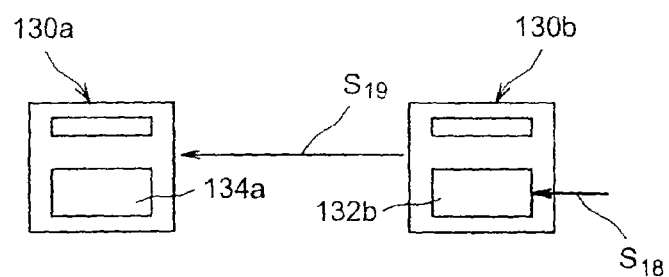
FIGS. 5A-5B show a second method of managing the end of communication between network interlaces of resources of a system on chip according to one embodiment of the invention.
Figure 5B:
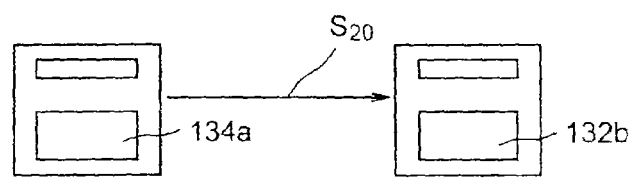

According to one variant shown in FIGS. 5A-5B, the second data reception resource B may be such that it terminates communication with the first data sending resource A.

This can be done by the processing unit (not shown) of the second resource B sending an end of data transmission signal $S_{18}$ to the input communication controller 132b of the network interface 130b of the second resource B.

The network interface 130b of the second resource B then sends a close communication message $S_{19}$ to the output communication controller 134a of the first data sending resource A.

The output controller 134a of the first resource A can send a close communication acknowledgement signal $S_{20}$ to the input controller 132b of the second resource B.

Data transiting in the network are transferred in the form of packets. A packet may be composed of data associated with protocol information such as the packet source or destination. Several data may be grouped in a single packet in order to reduce the passband cost related to this protocol information.

In a network on chip like that described above, in normal operating mode it may be arranged that an output communication controller cannot send a new packet unless a number of available data corresponding to a set value $X_{sec}$ are present in a memory of this output communication controller.

The network interfaces of resources of a system on chip according to the invention may also include means of forcing a data send.

When the number of data waiting to be sent is insufficient to form a complete packet, means may be provided to send a signal to the output communication controller 134a to force it to send data, to avoid a blocking situation. These means may be integrated into a processing unit of a resource.

The decision to send the forcing signal may thus be taken internally by the processing unit and it may depend on the application controlling the system on chip. For example, for an application of the system on chip to image processing, the processing unit of a resource may make the decision about sending a forcing signal as a function of an image size or a number of pixels per image line.

Delayed trigger means may also be set up at the output communication controller to force available data present in a memory of the output communication controller 134a to be sent when the quantity is less than a set value, provided that data remained available for a time period longer than a predetermined set period in a memory of the output communication controller.

In each case, even if the number of data to be transmitted existing in the memory of the first resource A is less than a send threshold, when the output communication interface of the first resource receives the "force send" signal or a signal from delayed trigger means, data can be sent to the second resource B provided that the number of credits available to the first resource A is sufficient.

Forced sending of data in this way is advantageous when it is required to terminate a communication and it may be necessary in some cases to be sure that there is no "forgotten" data transmission, or to prevent data from being sent to the wrong address. For example, as soon as the output controller 134a receives an end of communication indicator, it will be possible to send the last available data and to send a close communication message, either successively or simultaneously (in a single packet).

Sending of credits may be forced in the same way.

The quantity of credits sent by the input communication controller of the network interface of a resource may comply with a predetermined threshold that may have been set up or fixed through a configuration. This avoids the need to send credits too frequently and possibly congesting the network or limiting its passband.

According to a first possibility in the case in which credits remained available in a memory of an input communication controller for longer than a predetermined time, delayed trigger means may be set up to start sending these credits even when the number of credits available in the memory of the input communication controller is less than the initially defined predetermined threshold.

According to a second possibility that could be combined with the first possibility, means are set up to calculate the dynamic threshold for forcing sending credits even when the number of credits available in the memory of the input communication controller is less than the predetermined threshold. These means of calculating the dynamic threshold count the number of data received by the input communication controller of a network interface and increment a modulo counter $Y_{sec}$, every time that new data are received, where $Y_{sec}$ is equal to the set value for the size of credits. If all received data packet sizes are the same as the original set value, this counter remains equal to zero and the default threshold will be used.

If the size of received data packets is smaller than $Y_{sec}$, the value of the counter is then not zero and is used as a new temporary threshold for sending credits, and the counter is then reset to zero and the threshold returned to its initial value.

As for data, it is advantageous to force sending credits when it is required to end a communication, and in some cases it may be necessary to avoid forgetting to send the last credits related to the communication currently being closed, or to prevent sending credits to a wrong address. For example, it might be possible that when the input controller 132b receives an end of communication indicator, this will trigger sending the last available credits and a close communication message, either successively or simultaneously (same packet).

FIGS. 6A-6D show examples of data packet structures that could be used and could transit within a network on chip of a system on chip according to the invention.

Figure 6A:
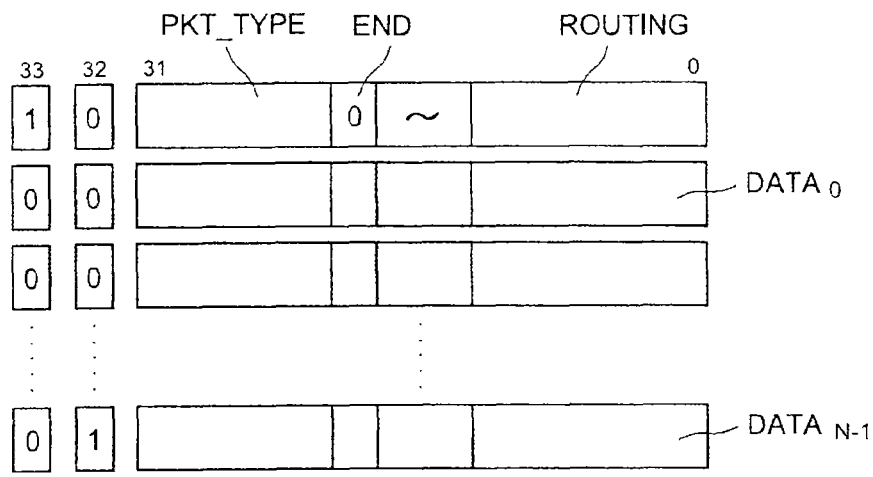
FIGS. 6A-6D show data formats to be processed and credit formats that might be exchanged within a system on chip according to one embodiment of the invention.

FIG. 6A shows a data packet comprising several 32-bit words, also called flits.

Each flit may be composed of 32 bits numbered from 31 to 0, plus 2 control bits, a first control bit numbered 33 indicating the beginning of a packet, a second control bit numbered 32 indicating the end of a packet. The first flit comprises a PKT_TYPE field indicating the packet type in its header, in other words if the packet is a packet of data to be processed or a credits packet. Information for rerouting the packet is contained in a ROUTING field. The next flits contain the $DATA_0, \ldots, DATA_{N-1}$ fields corresponding to data to be transmitted. The end of packet is given in the last flit.

Figure 6B:
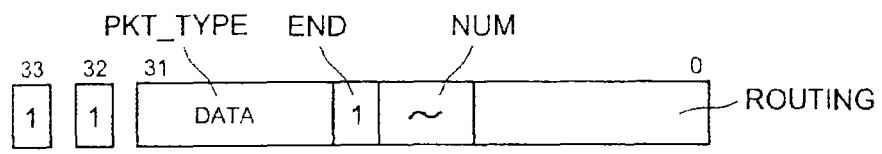

FIG. 6B shows an end of communication indicator packet. The header flit of this packet is similar to the header flit of the data packet described above with reference to FIG. 6A, except for an "end" bit for which the logical state indicates an end of communication, for example when set to '1'.

Figure 6C:
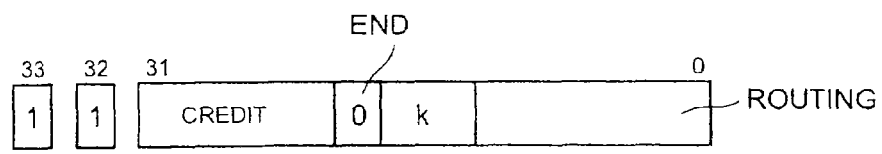

FIG. 6C shows a credits packet. The PKT_TYPE field is set to a value indicating that the packet contains credit information. An additional NUM field indicates a number of credits. In the example in FIG. 6C, NUM corresponds to a packet comprising k credits.

Figure 6D:
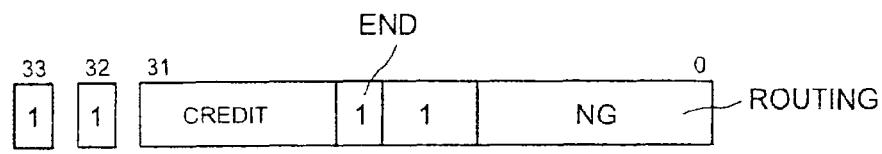

Another credits packet is shown in FIG. 6D. This packet comprises an end field set to the logical value '1' indicating end of communication and a number of credits equal to one.

Figure 7B:
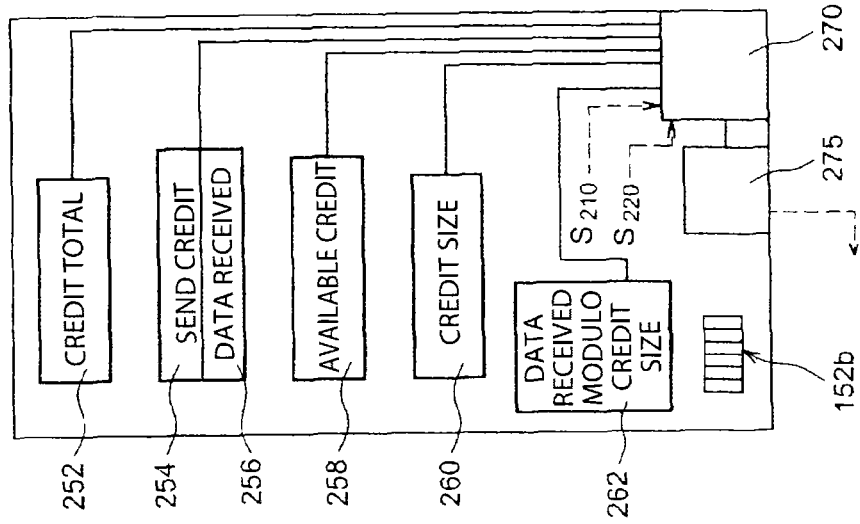
FIGS. 7A et 7B show an example of an adaptable device to start sending data, and an example of an adaptable device to start sending credits, respectively.
Figure 7A:
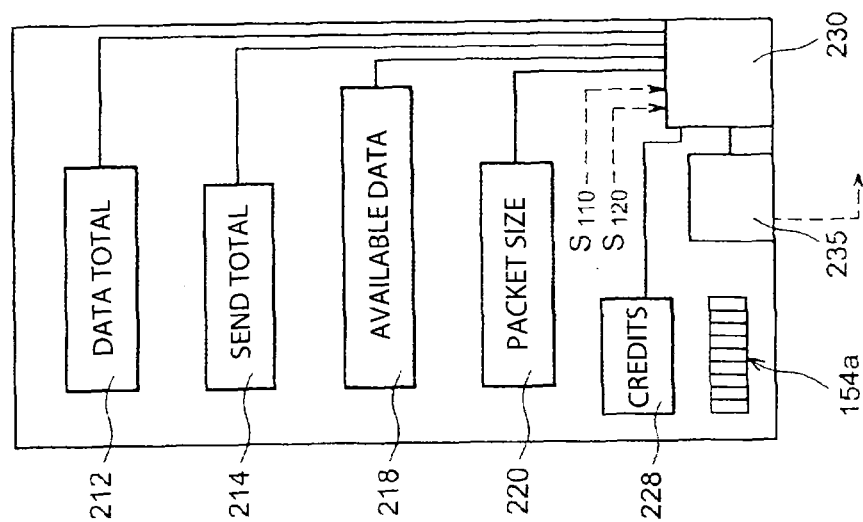

FIG. 7A shows an example of a management device for sending data to be processed from a network interface of the first resource A that will send data to the second resource B.

This device comprises a first register 212 indicating a total number of data to be processed. This total number of data is set up by configuration and is equal to a determined fixed value N when the link between the first resource A and the second resource B is static.

When setting up a dynamic communication, the first register 212 may be set equal to a particular value, for example with all its bits equal to 0, to enable detection of a dynamic communication by the network interface.

According to one variant embodiment, a register specific to the indication of the communication type (static or dynamic) may be provided for example with values equal to 0 or 1, to indicate one of the two types.

The device also comprises a counter 214 indicating a current number of data sent by the first resource A, while a register 218 indicates a current number of available data to be sent.

A register 220 indicates the set value size $X_{sec}$ of data packets, in other words the number of data that a data packet contains during normal operation.

This size is determined by configuration.

Depending on the state of registers 214, 218, 220 and possibly reception of a signal $S_{110}$ to force sending data or a signal $S_{120}$ from a delayed trigger device, means 230 controlling that data should be sent will trigger sending data provided that there is a sufficient number of received credits available as indicated by a register 228.

Means 235 may also be provided to format data in the form of packets as illustrated above.

FIG. 7B shows an example corresponding to the use of a management device for sending credits from a network interface of the second resource B that will send credits to the first resource A, and for which the operating principle has been described above.

This device comprises a first register 252 indicating a total number of credits to be sent, that is set up by configuration.

This total number of credits is equal to a determined fixed value when the communication between the first resource A and the second resource B is of the static type.

In the case of a dynamic communication, the register 252 may be set equal to a particular value, for example with all its bits equal to 0, to set up a distinction from the case of a static communication and to inform the second resource B that the data volume currently being exchanged with the first resource A is not known in advance and will be determined during and even at the end of the communication.

The device also includes a counter 254 indicating a current number of credits sent to the first resource A, associated with a counter 256 of data received from the first resource.

A counter 258 indicates a current number of available credits.

This counter 258 is initially equal to a value corresponding to an available memory size and is then incremented when data are consumed by the second resource B, and decremented when credits are sent to the first resource A.

The set value size $Y_{sec}$ of credit packets set up by configuration is given by a register 260.

Depending on the state of the registers 254, 256, 258, 260 and possibly reception of a signal $S_{210}$ to force sending credits or a signal $S_{220}$ from the delayed trigger device, means 270 of controlling sending of credits trigger sending of credits after credit data are formatted into packets using a module 275.

Network interfaces are preferably capable of knowing the order in which data or credits that they receive and that were sent by another interface, are to be sent, to make sure that the close communication message does not terminate the communication too soon and that end of communication data or credits are not lost.

Sent data or credits may be correctly ordered by the network or by the type of packet structure used (that may possibly contain information about the configuration to which the data/credits are related).

In the case of systems on chip, networks on chip are often designed so that for a given communication, the same physical link is used during the communication such that a first packet sent before a second packet necessarily arrives at the destination network interface before this second packet.

Nevertheless, it is possible that data transiting from a first network interface to a second network interface would use a first physical communication link and that credits transiting from the second to the first network interface would use a second physical link, data and credits also being in the correct order in this case.

The invention claimed is:

1. A system on chip comprising:
   plural resources connected to a network on chip through dedicated network interfaces, a network interface being adapted to interface a data processing circuit of a resource with the network on chip, each network interface comprising a local interface controller adapted to configure the network interface in a communication between two resources and to make the network interface adopt a series of configurations; and
   circuitry configured to set up a communication between a first and a second resource through first and second associated network interfaces respectively,
   wherein the first network interface comprises a first local interface controller, and the second network interface comprises a second local interface controller,
      wherein the first network interface comprises an output communication controller configured to receive credits from the second network interface, and send data via the network, to the second resource, and
      wherein the second network interface comprises an input communication controller configured to send credits via the network to the first network resource, and
      receive data addressed to the second resource,
   the circuitry being further configured to provide information to the output communication controller and the input communication controller when a new communication associated with a new configuration is set up, the information indicating if the communication between the first and the second resources is static or dynamic based on whether a number of data to be exchanged is known or unknown to the network interfaces when the communication is being set up, wherein
   the output communication controller of the first interface is further configured to receive an end of communication indicator between the first resource and the second resource with which a dynamic communication is set up, and
      send a close communication message to the second resource on the network on chip, following detection of the end of communication indicator, terminating the dynamic communication and the sending of data related to this communication, and
      inform the first local interface controller about the end of the communication, wherein the first local interface controller reconfigures the first interface for processing a new communication, and
   the input communication controller of the second interface is further configured to receive the close communication message sent by the first network interface, and terminate waiting for data to be processed by the second resource during this dynamic communication and the sending of credits related to the communication, and
      inform the second local interface controller about the end of the communication, wherein the second local interface controller reconfigures the second network interface for processing a new communication.

2. The system on chip according to claim 1, wherein
   the input controller of the second interface is further configured to send a message acknowledging closure of the communication on the network on chip to the first resource following reception of a close communication message, and
   the output controller of the first interface is further configured to receive the close communication acknowledgement message sent by the second resource.

3. The system on chip according to claim 1, wherein the end of communication indicator between the first resource and the second resource is output from the data processing circuit of the first resource.

4. The system on chip according to claim 2, wherein the output communication controller comprises a credit counter configured to count down a number of available credits, the close communication acknowledgement message further triggering reinitialisation of the credit counter.

5. The system according to claim 1, wherein credits not used by the output communication controller after sending a close communication message are made unavailable for another communication sent from this output communication controller.

6. The system on chip according to claim 1, wherein the input communication controller of the second interface is further configured to inform the second network interface controller about the end of the communication following closure of the dynamic communication.

7. The system on chip according to claim 1, wherein the second network interface informs the data processing circuit of the resource associated with this network interface about termination of a dynamic communication, following closure of this dynamic communication.

8. The system on chip according to claim 1, wherein data sent by the first network interface during a given communication between the first and second resources always transits through a same physical communication link of the network on chip, and credits sent by the second network interface always transit through the same physical communication link of the network on chip.

9. A system on chip comprising:
   plural resources connected to a network on chip through dedicated network interfaces, a network interface being adapted to interface a data processing circuit of a resource with the network on chip, each network interface comprising a local interface controller for configuring the network interface in a communication between two resources and to make the network interface adopt a series of configurations; and
   circuitry configured to set up a communication between a first and a second resource through first and second associated network interfaces respectively, wherein the first network interface comprises a first local interface controller wherein the first network interface comprising an output communication configured to receive credits from the second network interface, and
send data via the network to the second resource, and
wherein the second network interface comprises an input communication controller configured to send credits via the network to the first network resource, and
receive data addressed to the second resource,
the circuitry being further configured to provide information to the output communication controller and the input communication controller when a new communication associated with a new configuration is being set up, the information indicating if the communication between the first and second resources is static or dynamic based on whether a number of data to be exchanged is known or unknown to the network interfaces when the communication is being set up, wherein the input communication controller of the second interface is further configured to receive an end of communication indicator between the first resource and the second resource with which a dynamic communication is set up, and
send a close communication message to the first resource on the network on chip, following detection of an end of communication indicator, sending such a message terminating said dynamic communication and sending of credits related to this communication, and the output communication controller of the first interface is further configured to receive the close communication message sent by the second network interface, terminate the waiting of the first interface for credits during this dynamic communication and the sending of data related to this communication, and
inform the first local interface controller about the end of communication, wherein the first local interface controller reconfigures the first local interface for processing a new communication.

10. The system on chip according to claim 9, wherein
the output controller of the first interface is further configured to send a close communication acknowledgement message to the second resource on the network on chip, following reception of a close communication message, and
the input controller of the second interface is further configured to receive the close communication acknowledgement message sent by the first resource.

11. The system on chip according to claim 9, wherein the end of communication indicator between the first resource and the second resource is output from the data processing circuit of the second resource.

12. The system on chip according to claim 10, wherein sending the close communication acknowledgement message reinitialises a credit counter counting down a number of credits sent by the input communication controller.

* * * * *